UNITED STATES PATENT OFFICE.

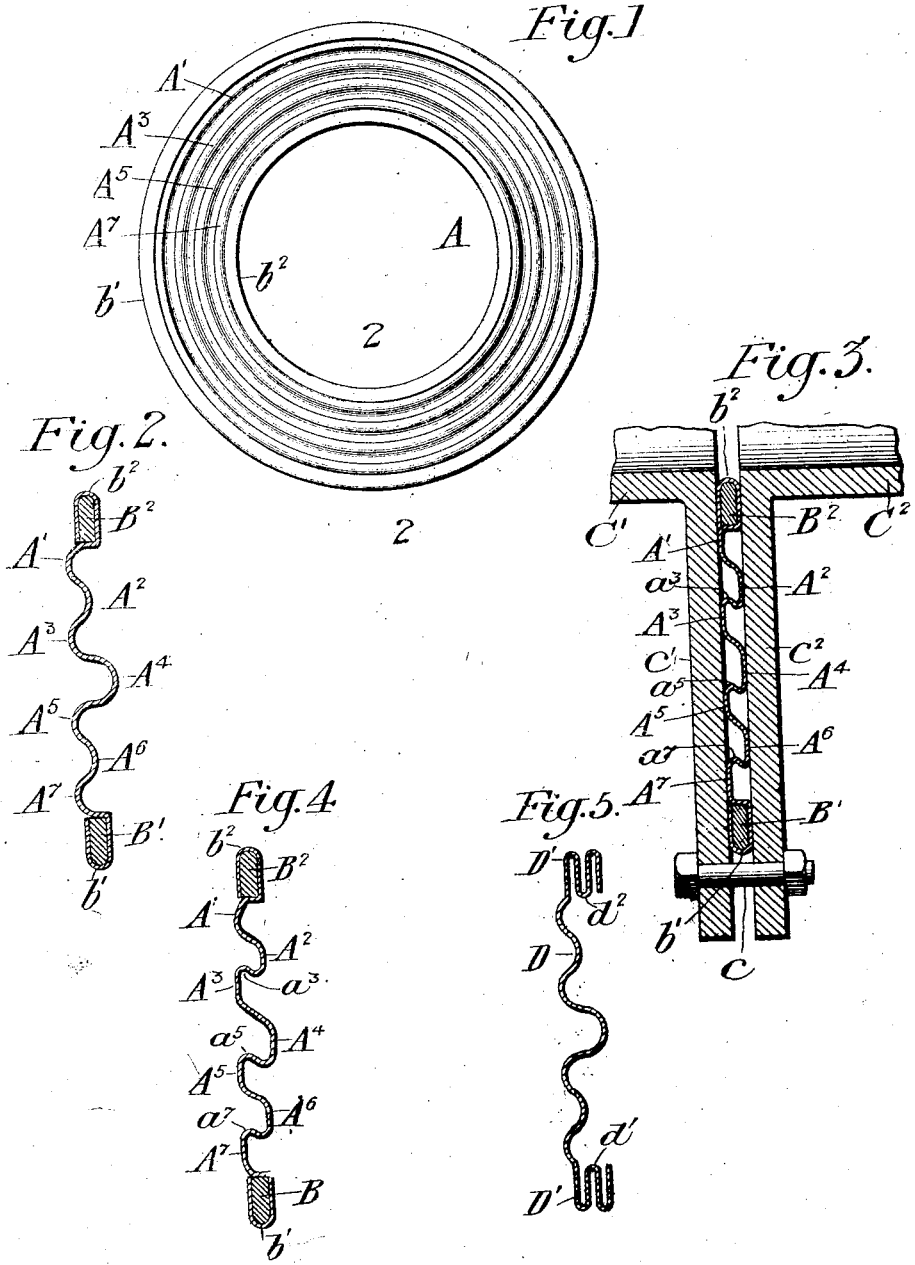

JAMES W. GUILLOTT, OF CHICAGO, ILLINOIS.

GASKET.

No. 805,645.

Specification of Letters Patent.

Patented Nov. 28, 1905.

Application filed March 19, 1904. Serial No. 198,907.

*To all whom it may concern:*

Be it known that I, JAMES W. GUILLOTT, a citizen of the United States, residing at Chicago, county of Cook, State of Illinois, have invented a certain new and useful Improvement in Gaskets; and I declare the following to be a full, clear, and exact description of the invention, such as will enable others skilled in the art to which it pertains to make and use the same, reference being had to the accompanying drawings, which form a part of this specification.

My invention relates in general to gaskets, and more particularly to metallic gaskets, especially designed for forming joints between sections of conduits for carrying fluids at high pressure.

The rapid deterioration of rubber and fabrics when exposed to steam, ammonia, and other injurious fluids prevents the use of rubber or fabric gaskets in the joints of conduits adapted to carry such fluids. It has therefore been proposed heretofore to employ metallic gaskets either in the form of solid washers or corrugated annular disks. The use of solid metallic gaskets is not only expensive, but has proved unsatisfactory, as the resulting joint is so rigid that the expansion of the sections when heated at the joint breaks the bolts uniting the flanges around the adjacent ends of united sections or else cracks the flanges themselves. Corrugated metallic gaskets as heretofore constructed are objectionable, for the reason that the corrugations become permanently flattened by the compression of the flanges between which the gaskets are interposed, thereby permitting leakage when the flanges contract.

The primary object of my invention is to provide a corrugated metallic gasket which will not be permanently flattened when compressed between the ends of the united sections of a conduit, but which will be sufficiently resilient to maintain a close contact between the ends of the united sections when they separate by contraction, thereby forming a permanently tight joint.

A further object of my invention is to provide a gasket which will be simple in construction, inexpensive in manufacture, and efficient and durable in use.

The herein-disclosed embodiment of my invention, generally described, consists in a metallic annular disk having concentric corrugations and metallic rings united to the inner and outer edges of the disk, thereby increasing the thickness of the disk at its edges, so as to protect the corrugations against flattening and prevent radial expansion of the disk when it is subjected to pressure.

My invention will be more fully described hereinafter with reference to the accompanying drawings, in which the same is illustrated as embodied in two convenient and practical forms, and in which—

Figure 1 is an elevational view; Fig. 2, a sectional view on line 2 2, Fig. 1, on an enlarged scale, showing the gasket before being compressed; Fig. 3, a view similar to Fig. 2, showing the gasket compressed between the flanges of a conduit-joint; Fig. 4, a view similar to Figs. 2 and 3, showing the gasket removed from the joint; and Fig. 5, a view similar to Fig. 2, of a modification.

Similar reference characters are used to designate similar parts in the several figures of the drawings.

A designates a metallic gasket consisting in an annular disk provided with concentric corrugations. The openings through the gasket may be of any desired diameter to correspond with the diameter of the conduit between sections of which the gasket is to be inserted to form a joint. The exterior diameter of the gasket may be varied to conform to the diameter of the usual circular flanges which surround the ends of the conduit-sections and through which securing-bolts are passed.

By reference to Fig. 2 it will be seen that a ring $B'$, of metal, is located concentrically around the gasket and is located within a fold $b'$, preferably formed integrally with the metal of the gasket. An inner ring $B^2$ is located within a fold $b^2$ around the inner edge of the gasket. The corrugations formed in the gasket between and concentric with the inner and outer rings may be of any desired number and depth; but I have found in practice that it is preferable to have some of the corrugations—as, for instance, $A'$ and $A^7$—project beyond the plane of the rings $B'$ and $B^2$, while other of the corrugations, such as $A^2$ and $A^6$, project in an opposite direction, but to a less extent than the plane of the opposite sides of the rings $B'$ and $B^2$. One or more of the corrugations—as, for instance, $A^4$—preferably projects in the same direction as the corrugations $A^2$ and $A^6$, but to an extent beyond the plane of the rings $B'$ and $B^2$.

The gasket constructed substantially as described when interposed between circular flanges $c^1$ and $c^2$, extending radially around the adjacent ends of sections $C'$ and $C^2$ of a conduit, forms a tight joint, owing to the corrugations being slightly flattened through the drawing together of the flanges by the tie-bolts $c$. The reinforcing-rings $B'$ and $B^2$ serve as stops to limit the movement of the flanges $c^1$ $c^2$ together, and thereby prevent the corrugations from becoming entirely flattened. The rings $B'$ and $B^2$ also serve to prevent the radial inward or outward expansion of the gasket, so that, when the corrugations are partially compressed, ribs, such as $a^3$, $a^5$, and $a^7$, are produced by the displaced metal.

The expansion of the metal of which the conduit-sections are formed causes the radial flanges to move toward each other, owing to the tie-bolts, such as $c$, preventing the expansion of the flanges away from each other. Such expansion of the joint is permitted, owing to the yielding nature of the gasket. The contraction of the metal of the conduit-sections would produce a leakage at the joint if the gasket were not sufficiently resilient to closely engage the opposing faces of the flanges, and thereby take up the varying space between the flanges. In my improved gasket the ribs $a^3$, $a^5$, and $a^7$ insure the slight movement in opposite directions of the adjacent corrugations when the joint contracts, so that the opposing surfaces of both flanges are tightly engaged. The resiliency of the gasket is also increased by the arrangement of the corrugations, as above described in connection with Fig. 2, some of which project to one side of the plane of the reinforcing-rings $B'$ and $B^2$, while others project to the opposite side of the plane of such rings. Action of the gasket in tending to expand beyond the opposite sides of the plane of the rings is indicated in Fig. 4, in which the gasket is shown as removed from between the flanges of the conduit-sections. In this figure it will be noticed that the corrugations $A'$, $A^2$, and $A^5$ have sprung toward the left beyond the plane of the rings, while the corrugation $A^4$ has sprung to the right of the plane of the rings.

In order to insure a tight fit between the inner periphery of the gasket, and thereby prevent dirt or foreign matter working outwardly from the conduit between the flanges and the gasket, the inner ring $B^2$ is preferably formed slightly thicker than the outer ring, so that when the bolts through the flanges are tightened a uniform tight bearing is formed between the inner periphery of the gasket and the adjacent sections of the conduit.

In Fig. 5 I have illustrated a modification in which the reinforcing-rings at the inner and outer edges of the gasket are formed integrally of the material of which the gasket is made. In this figure, $D$ indicates the corrugated disk, while $D'$ designates a ring formed around the outer edge of the gasket and composed of several thicknesses $d'$ of the metal. $D^2$ designates the ring formed at the inner edge of the gasket and composed of several thicknesses $d^2$ of the metal. The function performed by the rings $D'$ and $D^2$ is the same as that above described in connection with the rings $B'$ and $B^2$—namely, that of preventing the corrugations becoming flattened and smoothed out by the radial expansion of the gaskets when compressed between the flanges of the conduit-sections.

Any suitable metal may be employed in the manufacture of the corrugated disks; but in practice cold-rolled copper has been found preferable, as it possesses more resiliency than soft copper. The rings $B'$ and $B^2$ may be formed of any suitable metal—such, for instance, as iron, copper, or steel—and may be of any desired cross-section; but the cross-section is preferably flat, as shown. In lieu of using cold-rolled copper sheet-steel may be used, or Tobin bronze may be used, and such metal is preferable when the conduit is to carry superheated steam or ammonia, as copper is more readily attacked and destroyed by such fluids.

Another function performed by making the inner reinforcement thicker than the outer is that when the flanges surrounding the united sections are deflected by the pressure in the conduit a tight joint continues between the inner periphery of the gasket and the adjacent surfaces of the flanges even though the outer edges of the flanges approach toward each other, thereby preventing dirt and other foreign matter from working around the gasket into the space between the flanges. It has been found in practice that corrugated metal gaskets as heretofore constructed are so flattened when the flanges of the conduit are deflected that upon the flanges resuming their normal relative positions leakage occurs at the joint.

My improved gasket may be used between rough surfaces as well as machined surfaces, as the concentric points of contact between the corrugations and reinforcements of the gasket and the flanges around the united sections insure a tight joint, thereby avoiding the necessity of machining the surfaces of the flanges between which the gaskets are interposed. It is also obvious that my improved gasket may be used between two adjoined sections whether the opposing faces thereof are smooth or provided with a tongue and a groove or a male and female connection.

From the foregoing description it will be observed that I have invented an improved metallic gasket which, though light in structure, possesses sufficient resiliency to at all times maintain a tight joint between the sections of a conduit and which will permit the expansion and contraction of the metal of the conduit-joint without permanently flattening the gasket and without destroying a close contact between the gasket and both of the flanges around the conduit-sections.

Having now fully described my invention, what I claim as new, and desire to secure by Letters Patent, is—

1. A corrugated metallic gasket having a reinforcement around its outer periphery.

2. A corrugated metallic gasket having concentric reinforcements surrounding its inner and outer peripheries.

3. A gasket consisting in an annular corrugated metallic disk a concentric portion of which is increased in thickness.

4. A corrugated metallic gasket having its outer periphery increased in thickness by a reinforcing-ring.

5. A corrugated metallic gasket having its inner and outer peripheries increased in thickness by concentric reinforcing-rings.

6. A metallic gasket having a concentric reinforcement and provided with concentric corrugations projecting in opposite directions beyond the plane of the reinforcement.

7. A metallic gasket having its outer periphery bent around a concentric reinforcing-ring and provided with concentric corrugations projecting in opposite directions beyond the plane of the ring.

8. A metallic gasket having its inner and outer peripheries bent around concentric reinforcing-rings and provided with concentric corrugations projecting in opposite directions beyond the plane of the rings.

9. A metallic gasket having its outer periphery increased in thickness by a reinforcing-ring and having concentric corrugations some of which are of greater depth than the thickness of the ring while other corrugations are of less depth than the thickness of the ring.

10. A metallic gasket having its inner and outer peripheries increased in thickness by reinforcing-rings and having concentric corrugations some of which are of greater depth than the thickness of the rings while other corrugations are of less depth than the thickness of the rings.

11. A metallic corrugated gasket having a reinforcing-ring at its inner periphery and a concentric reinforcing-ring at its outer periphery the outer ring being of less thickness than the inner ring.

12. The combination with two conduit-sections having flanges projecting radially around the adjacent ends thereof, means for securing the flanges together, and a corrugated metallic gasket interposed between the flanges and having its inner periphery increased in thickness.

13. The combination with two conduit-sections having flanges projecting radially around the adjacent ends thereof, means for securing the flanges together, and a gasket interposed between the flanges composed of a corrugated metallic disk having its inner and outer peripheries increased in thickness, the thickness of the inner periphery being greater than that of the outer periphery.

14. The combination with two elements united to form a joint, of a corrugated metallic gasket interposed between said elements, means for uniting said elements together, and means for limiting the movement of said elements toward each other thereby protecting the interposed gasket and preventing the corrugations thereof being flattened.

In testimony whereof I sign this specification in the presence of two witnesses.

JAMES W. GUILLOTT.

Witnesses:
GEO. L. WILKINSON,
CLARA C. CUNNINGHAM.